(12) United States Patent
Riquelme

(10) Patent No.: US 7,340,889 B2
(45) Date of Patent: Mar. 11, 2008

(54) METHOD AND APPARATUS FOR TREATING EXHAUST GASES FROM COMBUSTION SOURCES

(76) Inventor: Pedro Riquelme, Los Mostos 7663, Penalolen, Santiago (CL)

( * ) Notice: Subject to any disclaimer, the term of this patent is extended or adjusted under 35 U.S.C. 154(b) by 100 days.

(21) Appl. No.: 11/083,553

(22) Filed: Mar. 18, 2005

(65) Prior Publication Data

US 2005/0223702 A1 Oct. 13, 2005

Related U.S. Application Data

(63) Continuation-in-part of application No. 10/526,875, filed as application No. PCT/US03/27701 on Sep. 4, 2003.

(30) Foreign Application Priority Data

| Sep. 5, 2002 | (CL) | ................................. 2048-2002 |
| Oct. 16, 2002 | (CL) | ................................. 2377-2002 |
| Oct. 16, 2002 | (CL) | ................................. 2378-2002 |
| Dec. 24, 2002 | (CL) | ................................. 2974-2002 |
| Mar. 10, 2003 | (CL) | ................................. 462-2003 |

(51) Int. Cl.
*F01N 7/12* (2006.01)
(52) U.S. Cl. ............................ 60/310; 60/274; 60/298; 60/309; 60/320
(58) Field of Classification Search .................. 60/272, 60/281, 297, 298, 309, 310, 320, 324, 274
See application file for complete search history.

(56) References Cited

U.S. PATENT DOCUMENTS

| 2,487,176 | A | * | 11/1949 | Pitt et al. | ..................... 96/312 |
| 3,630,030 | A | * | 12/1971 | Wagner | ..................... 60/274 |
| 3,967,941 | A | * | 7/1976 | Terao | ..................... 96/318 |
| 4,958,490 | A | * | 9/1990 | Harjunpaa | ..................... 60/274 |
| 5,080,696 | A | | 1/1992 | Marchand et al. | ..................... 55/71 |
| 5,121,602 | A | * | 6/1992 | McCorvey | ..................... 60/310 |
| 5,979,159 | A | * | 11/1999 | Adamczyk et al. | ..................... 60/274 |
| 7,028,539 | B2 | * | 4/2006 | Erlach et al. | ..................... 73/116 |

FOREIGN PATENT DOCUMENTS

| EP | 0 691 153 | 10/1996 | |
| FR | 2 586 204 | 2/1987 | ..................... 53/34 |

OTHER PUBLICATIONS

International Search Report from the European Patent Office in International Application No. PCT/US/03/27701.

* cited by examiner

*Primary Examiner*—Binh Q. Tran
(74) *Attorney, Agent, or Firm*—Hallie A. Finucane; Westman, Champlin & Kelly, P.A.

(57) ABSTRACT

A method and apparatus for removing contaminant emissions from the exhaust stream of a combustion device, comprising increasing the dew point of the exhaust gases; reducing the velocity of the exhaust stream; reducing the temperature of the exhaust stream such that a part of the gases in the exhaust stream are condensed into liquid form, such that the liquid traps particles and noxious gases from the exhaust stream yielding a liquid extraction stream and a residual gaseous exhaust stream; and collecting the extraction stream.

27 Claims, 4 Drawing Sheets

METHOD AND APPARATUS FOR TREATING EXHAUST GASES FROM COMBUSTION SOURCES

CROSS-REFERENCE TO RELATED APPLICATION

The present application is a Continuation in Part of and claims priority of U.S. patent application Ser. No. 10/526,875, filed Mar. 4, 2005, entitled METHOD AND APPARATUS FOR TREATING EXHAUST FROM COMBUSTION DEVICES, which is a Section 371 National Stage Application of International Application No. PCT/US2003/027701, filed 4 Sep. 2003 and published as WO 2004/022203 A1 on 18 Mar. 2004, in English, the content of which is hereby incorporated by reference in its entirety.

BACKGROUND OF THE INVENTION

Nowadays, combustion is the prime energy source because of its universality of applications. But the increase in its usage causes pollution problems, which are affecting the planet.

Presently, the problem created by contaminant emissions from combustion sources constitutes a significant contribution to pollution and related environmental concerns. A number of measures, techniques or devices for reducing the contaminant emissions (i.e., both in particulate and gaseous form) in combustion exhaust streams have been proposed.

For example, a number of proposals to use filters to capture and remove particulates and environmentally noxious gases, such as ozone, sulfurous acids, and carbon monoxide, among others, have been made. A variety of filters have been proposed, including for example, electrostatic filters, sleeve type filters, plate filters, and others. The cost and efficacy of different filter systems varies and cheaper, more cost effective solutions are desired.

It has also been proposed to rinse exhaust streams with showers of water or other liquid(s) to wash from the exhaust streams particulates and noxious gases. Unfortunately, these methods contribute little or nothing to the reduction of contaminants liberated to the environment, do not provide desired pollution reduction, or are too costly.

In the case of conventional gas washing devices applied to mobile sources, specifically exhaust pipes of vehicles, the main disadvantage is the necessity for using great amounts of water. High volumes of fluid are necessary because the washing liquid is applied to high velocity, high temperature (e.g., typically at temperatures of well over 100° C. or more) streams that leads to significant evaporation into the exhaust stream, resulting in the emission of a moisture enriched exhaust stream. Chilean Patent Application Publication No. 615-99 describes a typical spraying device located onto the exhaust pipe, which produces a water curtain for conveying the particles to a container or tray adjacent to the pipe, producing the above-described problems.

Chilean Patent No. 40,474 discloses a wet filter for cleaning flue gases comprising an external cylindrical shroud and a coil at the upper end of the shroud. Fumes passing through the coil are washed by water, but the system does not effectively retain small particulates or noxious gases from the flue stream.

Thus, a need exists for a way to reduce the emission of pollutants from the exhaust streams of combustion sources, either particulates or gases, such as internal combustion engines, which are more effective and cheaper to implement and operate than current available means.

SUMMARY OF THE INVENTION

The present invention relates to a method and apparatus for treating the exhaust stream from a combustion source to reduce the emission of pollutants, e.g., particulates and noxious gases, into the environment. By combustion source is meant a device, which burns fuel to generate heat or power. Illustrative examples include internal combustion engines such as gasoline engines or diesel engines which are used to power vehicles (e.g., automobiles, trucks, buses, water craft, trains, etc.), and in fixed locations (e.g., to generate electricity, heat, or mechanical power for buildings, factories, or equipment, as well as other devices which burn fuel to generate heat or steam or dispose of waste. Illustrative examples of the kinds of fuel which may be burned include gasoline, kerosene, diesel fuel, oil, coal, natural gas, wood and other biomass fuels, municipal and residential waste, etc. For ease of explanation, the invention will be described with reference to internal combustion engines; it will be understood, however, that the invention is applicable to other combustion devices, e.g., trash incinerators or heating furnaces.

In brief summary, the method comprises a) collecting an exhaust stream emitted by a combustion device through an exhaust channel; b) reducing the velocity of the exhaust stream; c) reducing the temperature of the exhaust stream such that a part of the gases in the exhaust stream are condensed into liquid form whereby the condensed liquid traps particles and noxious gases from the exhaust stream yielding a liquid extraction stream and a residual, substantially gaseous, exhaust stream; and d) collecting the extraction stream. In some preferred embodiments, the exhaust stream may in addition be washed with a liquid agent, e.g., water, to entrain particulates and gases from the exhaust stream. In some embodiments, the dew point of the exhaust stream may be elevated, e.g., by incorporation of water vapor therein, so as to facilitate condensation of liquid from the exhaust stream to enhance the entrapment of particulates and gases from the exhaust stream.

In addition, the method for reducing contaminant emissions, including noxious gases and particulate material, in an exhaust stream from a combustion source, comprises a) collecting said exhaust stream emitted by said combustion source; b) increasing the dew point of said exhaust stream by injecting water from an aqueous humidifying/neutralizing solution; c) reducing the velocity and pressure of said exhaust stream having an increased dew point; d) cooling said exhaust stream having an increased dew point with reduced temperature and pressure, thereby causing partial condensation of the gases using the particulate material as condensing nuclei, such that part of the gases in said exhaust stream are condensed into liquid form, whereby said liquid contains particulate material and noxious gases from said exhaust stream, yielding a liquid extraction stream and a residual gaseous, non-condensed stream; and e) collecting said condensed extraction stream.

In addition, the apparatus for reducing the contaminant emissions in an exhaust stream from a combustion source, comprises a) means for receiving an exhaust stream emitted from a combustion source by an exhaust channel; b) means for increasing the dew point of said exhaust stream; c) means for reducing the velocity and pressure of said exhaust stream with increased dew point; d) means for reducing the temperature of said exhaust stream with increased dew point, such that a part of the gases in said exhaust stream are condensed into liquid form, such that said liquid traps particles and noxious gases from said exhaust stream, yielding a liquid extraction stream and a residual gaseous exhaust stream; and e) means for collecting said extraction stream.

BRIEF DESCRIPTION OF THE DRAWINGS

The invention is explained with reference to the drawing wherein.

These figures are intended to be merely illustrative and non-limiting.

DETAILED DESCRIPTION OF THE PREFERRED EMBODIMENTS

The present invention provides a method and an apparatus for reducing the contaminant emissions in the exhaust stream from combustion devices.

Figure 1:
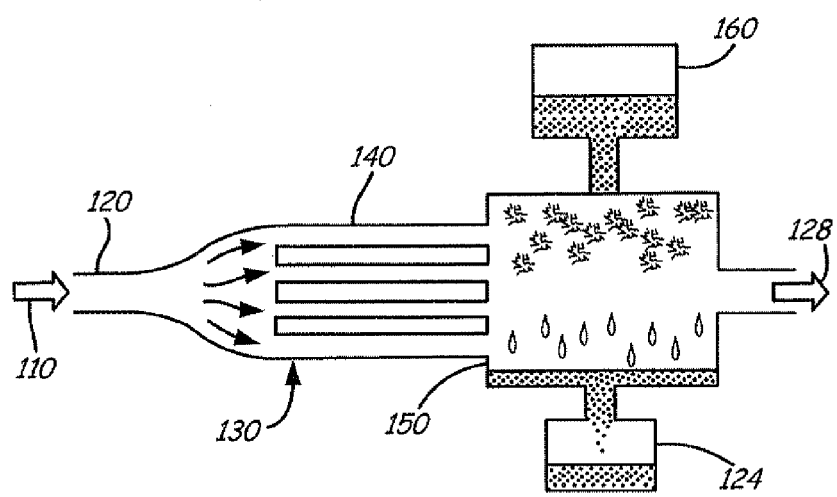
FIG. 1 is a schematic illustration of an apparatus applying the method of the invention.

FIG. 1 illustrates one embodiment of the method and apparatus of the invention. An exhaust stream 110 is collected from the exhaust tube 120 of an internal combustion engine (not shown) or other combustion source. The exhaust stream is separated into multiple sub flows through tubes 130. The collective cross sectional area of tubes 130 is greater than that of exhaust tube 120. As a result, the velocity of the exhaust stream is reduced. While passing through tubes 130, the exhaust stream is typically also cooled, e.g., by passing cooling medium 140 against the outside of tubes 130. The slowed, preferably cooled exhaust stream then passes into a washing stage 150 where washing agent 160 is applied. Some of the gases in the exhaust stream will have condensed into liquid form (either here or earlier in tubes 130) and the drops of those condensed gases and of the applied washing agent will entrap particulates from the exhaust stream as well as some additional gases from the exhaust stream. These liquids with entrained particulates and gases, i.e., extraction stream and residual washing agent, respectively, are collected, e.g., in sump 124. The residual exhaust stream 128 is then passed on and typically released to the environment. In accordance with the invention, residual exhaust stream 128 will contain lesser quantities of particulates and noxious gases than did original exhaust stream 110.

Figure 2:
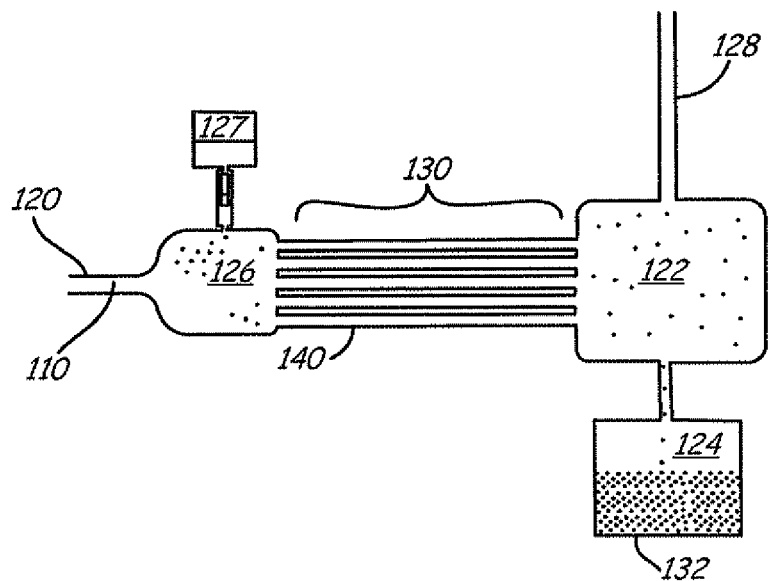
FIG. 2 is a schematic illustration of an apparatus applying the method of the invention.

FIG. 2 illustrates another embodiment of the method and apparatus of the invention. An exhaust stream 110, which preferably may be a hot exhaust stream, is collected from the flue tube 120 of a combustion source (such as an internal combustion engine (not shown) and/or a combustion device, i.e. a burner (not shown)). As shown in FIG. 2, an aqueous humidifying/neutralizing solution reservoir 127 is filled with the humidifying/neutralizing solution. From this reservoir, the solution enters the humidifying chamber 126. The collected exhaust stream is humidified by injection of the aqueous humidifying/neutralizing solution. The condensed gases 122 produce droplets of condensed liquid, which ultimately are collected at the sump 132. The exhaust stream is separated into multiple sub flows by tubes 130 that slow down the velocity of the exhaust stream, because the total cross section of the tubes 130 is greater than the cross section of the flue tube 120. This cooling of the gases reduces significantly their volume and pressure.

In the case of a mobile source, this reduction in the speed of the stream, together with the cooling thereof, significantly reduces its volume and pressure, thus reducing the overall backpressure of the stream. This is highly advantageous for the performance of the internal combustion engine.

The particulate material from combustion acts as condensing nuclei for the droplets of the aqueous humidifying/neutralizing solution, thus favoring the formation of condensed droplets.

The cooling causes some of the gases to condensate in liquid form (inside the tubes 130) forming droplets and together with the solution droplets of the applied humidifying agent, will entrap particulates from the flue stream. The liquid with entrained particulates and gases (i.e., the extraction stream) are collected in sump 124. The residual flue stream 128, formed by non-condensing gases, is released to the environment. According to the invention, the residual exhaust stream 128 will contain lesser quantities of particulates and noxious gases than did the original exhaust stream 110.

An effective way to reduce the velocity of the exhaust stream is to direct the exhaust stream through one or more channels, preferably multiple channels, having progressively greater cross section area. Just as a river of water slows as the channel widens, the speed at which the exhaust stream passes through the channel will slow as the cross section area is increased. The increase in cross sectional area may be provided at one or more discrete points (e.g., via a manifold) or may be provided substantially continuously over a portion of the course the exhaust stream follows. In some embodiments, the exhaust stream will be separated or divided into two or more sub flows in order to carry out the invention. Typically the exhaust stream will be separated into sub flows through several channels or tubes which may each have an individually smaller cross sectional area, but which collectively have a larger cross sectional area than the cross sectional area of the exhaust tube from the internal combustion engine source. Use of several small channels or tubes is typically preferred because it facilitates heat extraction, thereby facilitating condensation of part of the gases in the exhaust stream.

Figure 3:
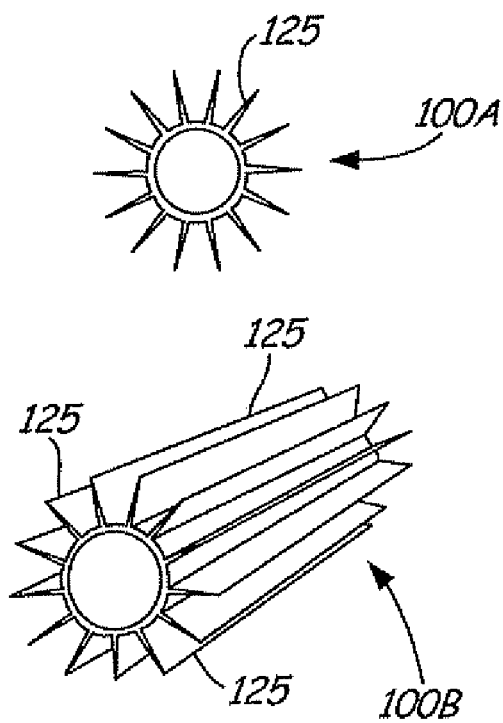
FIG. 3 is a view of an illustrative embodiment of a heat dissipating tube of the apparatus of the invention.

Slowing the flow of the exhaust stream facilitates washing as provided below and also facilitates cooling the exhaust stream comprising a passive cooling stream for the stream. Typically, the exhaust stream will be cooled by transferring heat from the exhaust stream to a cooling medium. For example, the channels through which the exhaust stream is directed may be the tubes of a heat exchanger which extracts heat from the exhaust stream and transfers the heat to a cooling medium such as ambient air which contacts the outside of the tubes. In some embodiments, a stream of ambient air will be directed against the tubes, e.g., by fans. If desired, other cooling mediums, such as chilled water or other refrigerants, may be used. An efficient way for cooling the tubes is to make them from a highly conductive metal, such as aluminum, and providing cooling fins 125 on its external surface, as shown in FIG. 3. FIG. 3 shows anodized aluminum tubes, 100A and 100B, provided with refrigerating fins 125, which can be used in the apparatus and method of present invention.

Depending on the type of the emission source, air, water or some other fluid, or other cooling mediums, may provide cooling of the dissipation tubes. As an example, in the case of a mobile source such as a bus or truck, the apparatus may be mounted on an external portion of the roof of the vehicle such that ambient air passes over the apparatus as the vehicle moves. Fans may be used to blow the air to increase the effectiveness of the heat extraction. In the case of fixed sources, the device may be sprayed with, or submerged in a cooling medium, e.g., circulating chilled water or other refrigerating liquid, to cool the dissipating tubes 100A, 100B and passing tubes 130. Though this solution ensures operation under any conditions, there is an energy expense and greater apparatus weight and bulk to be considered.

The dissipating tubes 100A, 100B, 130 as well as the hollow block 126, constituting the condensing chamber are preferably made with high thermal conductivity metals in order to facilitate cooling the exhaust stream. It is also possible to fabricate the device using only thermally conductive polymeric materials, such as poly-paraphenylene terephthalamide, i.e., Kevlar®, depending on the use intended for the device.

It is important to mention that the effect of reducing the exhaust stream of gas temperature, as it passes through the dissipating tubes 100A, 100B, 130, allows for a significant reduction of its volume and pressure upon entering the condensing chamber. This reduction of the volume and pressure of the gases in the dissipating tubes, reduces the backpressure of the exhaust stream, which is particularly important for effective operation of the internal combustion engine.

To increase the amount of condensation of gases from the exhaust stream which can be achieved, thus tending to entrap more of the particulate fraction of the emissions and a greater proportion of the noxious gases in the exhaust stream, the method of the present invention provides for increasing the dew point of the exhaust stream. This is typically achieved by introducing water or an aqueous humidifying/neutralizing solution into the exhaust stream. Water or the aqueous humidifying/neutralizing solution may be introduced into the exhaust stream, preferably hot exhaust stream, by any of a number of ways, including but not limited to spraying or misting water, preferably hot or the aqueous humidifying/neutralizing solution into the exhaust stream, passing the exhaust stream by a body or reservoir of water or of aqueous humidifying/neutralizing solution within a chamber, or injecting water vapor or water vapor from the aqueous humidifying/neutralizing solution into the exhaust stream. The method for accomplishing the humidifying of the exhaust stream is not important. A portion of the thusly applied water or solution will be evaporated and absorbed into the exhaust stream. The action of evaporating the water or aqueous humidifying/neutralizing solution also serves to reduce the temperature of the exhaust stream. In addition, by increasing the humidity content, the exhaust stream attains a higher temperature dew point.

FIG. 2 is a schematic illustration of such an embodiment. Exhaust stream 110 from, for example, an internal combustion engine (not shown) enters chamber or space 126 in which a liquid sprayer 127, injects water or an aqueous humidifying/neutralizing solution into the exhaust stream, thereby increasing its moisture content and raising the temperature of the dew point of the exhaust stream. Thus, when the exhaust stream reaches a dissipating space where it is cooled, condensation of gases from the exhaust stream will more readily occur. The condensed gases 122 are removed from the dissipating space for storage and optional further treatment before being disposed of.

Figure 4:
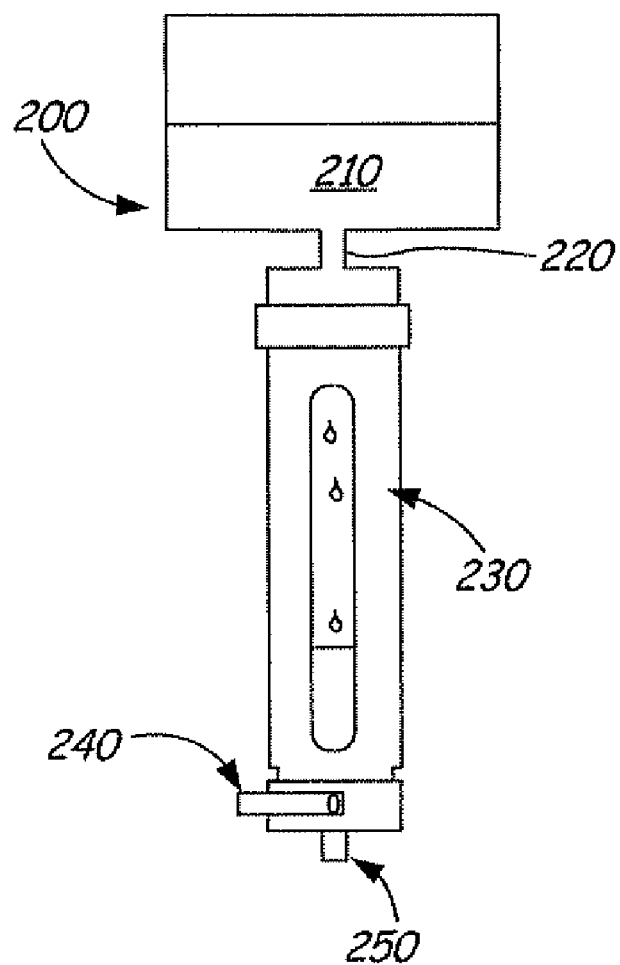
FIG. 4 is a schematic view of the injector for the humidifying solution.

FIG. 4 illustrates another manner of injecting water to raise the temperature of the dew point of the exhaust stream. A liquid dosing device 200 providing a means for contacting the liquid, in the form of droplets, with the exhaust stream, preferably hot exhaust stream, in a space, whereupon the high temperature of the exhaust stream causes the liquid to evaporate. The liquid dosing device 200 comprises a hollow cylinder 230 that at its upper end has an entrance for the liquid 220, preferably a mechanical or electric driven valve, through which the liquid enters an orifice located immediately beneath the entrance 220. The diameter of orifice 220 is modulated, by a constriction element, thus permitting controlling the size of the droplets in accordance with the nature of the liquid being injected. By controlling the size and frequency of the droplets, it is possible to control the volume of the liquid within the hollow cylinder 230. At the lower end of the hollow cylinder 230, a constriction element 240 is located, which adjusts the amount of droplets entering the space where the gases are humidified. As an example, adjusting the constriction element to a rate of about 16 droplets per second equals 1 ml. It is noted that the amount of liquid will depend on the amount of gas flowing and the nature of the liquid. Optionally, the hollow cylinder 230 has a window permitting visual monitoring of the liquid and the entering movement of the liquid 210 inside the cylinder. When there is a sufficient amount of liquid within the cylinder, the droplets exit thereof through the evacuation tube 250 and, driven by gravity, they enter the space or chamber encountering the exhaust stream and evaporate, thereby elevating the temperature of the dew point of the exhaust stream.

In a more preferred embodiment, the injector device is a pump driven injector. The amount of liquid delivered is controlled by a dew point measuring instrument, which adjusts the liquid flow accordingly.

The temperature of the dew point of the exhaust stream will be substantially determined by its composition, i.e., principally the amount of moisture that it contains which will in turn be dependent upon the moisture content of the fuel burned and the air mixture which support combustion. The ease with which the exhaust stream can be induced to condense into liquid from the gaseous components thereof will depend upon the temperature of the exhaust stream and the ambient conditions. For example, in cool wintertime conditions, it will typically be easy to cool the exhaust stream sufficiently so as to induce the desired condensation. However, under hot conditions and particularly dry conditions such as prevail during the summer time in many locations, spontaneous condensation does not occur due to the prevailing low humidity and high temperature. Under such conditions, it is preferable or even necessary to raise the dew point of the exhaust stream as described herein.

For a better understanding of the effect of the gas humidity and its possible condensation, it is useful to understand the concepts of relative and absolute humidity of gases, especially the ones generated by combustion. Absolute Humidity refers to the amount of water vapor contained in the combustion gases. The maximum amount of water vapor a gas may contain, i.e., its saturation point, will depend in part upon its temperature (the higher the temperature, the higher will be the saturation point). Absolute Humidity is the amount of water vapor contained in a volume of a gas (air), measured in grams of vapor per cubic meter of gas (air). In contrast, Relative Humidity is the amount of water vapor contained in the combustion gases (air) in relation with the maximum possible amount contained at said temperature. Relative humidity is expressed as a percentage. By example, 80% relative humidity means that the combustion gases contain 80 parts of water vapor in relation to the 100 parts possible to contain at saturation point.

For the same amount of water vapor contained in the combustion gases, relative humidity varies inversely with temperature: the higher the temperature, the lower the relative humidity, and vice versa. As an example, one cubic meter of combustion gases contains 4.85 grams of water vapor. If the temperature of said gases is 0° C., they are saturated, at 100% relative humidity. However, if the temperature is 10° C., their relative humidity is only 52%. At a temperature of 30° C., their relative humidity will be only 16%. In all these cases, the absolute humidity is 4.85 grams of water per cubic meter of gas.

The exhaust stream as emitted by the combustion source comprises a particulate fraction and a gaseous fraction. In accordance with the invention, as it is cooled, a portion of the gaseous fraction will condense whereby at least a portion of the particulate fraction will become entrained in the condensate. In addition, a portion of the noxious gases within the exhaust stream will be entrained within the liquid condensate. The resultant liquid condensate or extraction stream with entrained particulate fraction and entrained gases can be collected, thereby avoiding emission of those components into the ambient environment.

Typically, the means for reducing the velocity of the exhaust stream comprises one or more channels of increasing cross sectional area. The exhaust stream may be passed through the one or more channels that progressively increase in cross section area, or the cross section area may be increased in one or more discontinuous changes. For example, as shown in FIG. 1, the exhaust channel may pass through a manifold into a set of smaller tubes.

To facilitate cooling of the exhaust stream, channels and chambers of the apparatus should be made from materials which are highly conductive of thermal energy. A typical choice will be metal which can be readily shaped and configured as desired, is durable, dimensionally stable at the necessary temperatures, etc. As will be understood, portions of the apparatus can also be made of other materials, e.g., suitable polymeric materials.

Another important point of invention is that the condensate obtained from the combustion gases has a very low pH. This may cause an attack on the metallic components of the apparatus, thus reducing its useful life. The invention addresses this problem by injecting an aqueous humidifying/neutralizing solution.

The aqueous humidifying/neutralizing solution comprises a soluble base, which is not deleterious to the environment. The solution has buffer components for neutralizing the acidic pH of the condensate, and additionally an aqueous base for providing humidity. The buffers can comprise any salt or base serving this purpose, such as hydroxides of alkaline metals, hydroxides of alkaline-earth metals, ammonia, organic bases or any compound with buffer capacity. Examples of the soluble base include, for instance, sodium or potassium hydroxide, calcium hydroxide, ammonia and the like. Examples of the aqueous base include, for instance, water. The concentration should be stoichiometric for neutralizing the pH. Thus, the liquid condensate will have a neutral reaction, facilitating its processing and disposal, and being not harmful for the apparatus.

An advantage of the present invention is that it provides for extraction of particulate and gaseous pollutants from the exhaust streams of internal combustion engines, thereby reducing the effects of pollution. A large fraction of particulates smaller than 10 microns can be removed by the invention.

EXAMPLE 1

In an embodiment, the apparatus was installed on the roof of a diesel powered bus. For a concentration of 18.9 g of water vapor/1 kg of air, the dew point temperature is approximately 23.8° C. For simplicity, the density of the combustion gases was assumed to be equal to that of air at about 35° C.

In these conditions, for the occurrence of spontaneous condensation, the temperature of the gas shall be lower than the dew point temperature, namely about 23.8° C. Therefore, it will suffice to cool the gases to a temperature lower than 23.8° C. to produce condensation of the gases. This condition occurs mainly during wintertime in some climates, but not during summertime in some climates, and not where the average temperatures may be higher than about 30° C. Accordingly, for the present invention, it is necessary under such conditions to cool the gases to temperatures lower than this, by using a simple refrigeration system.

One alternative for producing condensation of the combustion gases during summertime is to increase the humidity of the gases by injecting water vapor.

Let us suppose the invention is installed onto a mobile source, namely a bus. In this case, the amount of emitted gases is variable, depending on the bus being detained or going. Simplifying the model, let us assume that this source emits an average of 50 liters of combustion gases per second, meaning that in 20 seconds it will emit about 1 m$^3$ of combustion gases. Based on this example, the amount of water generated by the combustion of the diesel engine is about 18.9 g/m$^3$, and to that we add the water provided by the device of the invention. This amounts to 2 g/second of water vapor, in other words, it will take 20 seconds (4 coils×0.5 g/second) to produce 1 m$^3$. Consequently, the device provides 40 g of water vapor, which add to the 18.9 g generated by the combustion. The Mollier Table states that, under these conditions, the temperature of the dew point raises to 43° C. Then, if the combustion gases are cooled to this temperature, condensation will occur. To cool the gases to this temperature presents no difficulties, permitting therefore to produce condensation in a mobile source during summertime.

EXAMPLE 2

In tests on a diesel-powered bus on a winter day having ambient temperatures of from about 4° C. to about 12° C., up to 80 liters of condensed liquid were collected.

What is claimed is:

1. A method for reducing contaminant emissions from a combustion source, comprising:
   receiving from an exhaust tube an exhaust stream emitted by the combustion source, the exhaust stream including particulate material and noxious gases;
   injecting an aqueous liquid into the exhaust stream, thereby increasing the humidity and elevating the temperature of the dewpoint;
   cooling the exhaust stream by passing the exhaust stream through a plurality of tubes to at least partially condense the exhaust stream to produce a liquid extraction stream and a residual gaseous stream, the liquid extraction stream comprising the particulate material, the aqueous liquid condensed on the particulate material, and the noxious gases dissolved in the condensed aqueous liquid; and
   collecting the condensed extraction stream.

2. The method of claim 1, further comprising discharging the residual gases.

3. The method of claim 1, wherein the cooling of the exhaust stream comprises directing the exhaust stream into the plurality of tubes having a greater collective cross-sectional area than the cross sectional area of the exhaust tube to reduce the velocity and pressure of the exhaust stream.

4. The method of claim 1, further comprising removing the condensed extraction stream and treating the extraction stream, rendering the extraction stream suitable to be safely disposed of within a municipal sewage network.

5. The method of claim 1, wherein the dew point of the exhaust stream is increased by the injection of the aqueous liquid prior to cooling the exhaust stream.

6. The method of claim 1, wherein the injecting of the aqueous liquid into the exhaust stream comprises spraying the liquid into the exhaust stream.

7. The method of claim 1, further comprising providing a source of the aqueous liquid within a chamber through which the exhaust stream passes, such that the aqueous liquid from the source is evaporated into the exhaust stream.

8. The method of claim 1, wherein the injecting of the aqueous liquid comprises injecting water vapor from the aqueous liquid as a vapor into the exhaust stream.

9. The method of claim 1 wherein the plurality of tubes dissipate heat through cooling fins, air, water spraying, or immersion in a cooling medium.

10. A device for reducing the contaminant emissions from a combustion source, comprising:
   a chamber for receiving an exhaust stream emitted by a combustion source from an exhaust tube, the exhaust stream including particulate material and noxious gases;
   a fluid injector containing an aqueous liquid in fluid communication with the chamber for increasing the temperature of the dew point of the exhaust stream;
   a heat exchanger in fluid communication with the chamber for reducing the temperature of the exhaust stream, such that a part of the gases in the exhaust stream are condensed into liquid form, such that the liquid traps particles and noxious gases from the exhaust stream, yielding a liquid extraction stream and a residual gaseous exhaust stream; and
   a container in fluid communication with the heat exchanger for collecting the extraction stream.

11. The device of claim 10, wherein the heat exchanger comprises one or more tubes having a greater collective cross sectional area than the cross section area of the exhaust tube.

12. The device of claim 10, further comprising:
   a condensing chamber in fluid communication with the heat exchanger for receiving the reduced temperature exhaust stream; and
   a sump for confining the liquid obtained from the condensed gases.

13. The device of claim 10, wherein the fluid injector injects liquid from the aqueous liquid into the exhaust stream, prior to reducing the temperature of the exhaust stream.

14. The apparatus of claim 10, wherein the fluid injector comprises a pump driven injector.

15. The device of claim 10, wherein the fluid injector comprises a liquid dosing device comprising a hollow cylinder having a liquid entrance at a first end, an orifice permitting entrance of liquid to the hollow cylinder proximate the liquid entrance, and a constricting element at a second end of the hollow cylinder to adjust the number of droplets entering the chamber.

16. The device of claim 15, wherein the liquid dosing device has an exit proximate the first end permitting exiting of the liquid by gravity towards a liquid deposit in the hollow cylinder.

17. The device of claim 16, wherein the hollow cylinder has a window permitting visual monitoring of the liquid level and droplets movement.

18. The device of claim 15 wherein the liquid entrance comprises an electric or mechanical valve.

19. The device of claim 15 wherein the liquid dosing device further comprises an exit tube proximate the constricting element at the second end of the liquid dosing device for the droplets to exit the cylinder and enter the chamber.

20. The method of claim 1, wherein the aqueous liquid comprises a water base and buffers selected from hydroxides of alkaline metals, hydroxides from alkaline-earth metals, ammonia, organic bases and combinations thereof.

21. The device of claim 10, wherein the aqueous liquid comprises a water base and buffers selected from hydroxides of alkaline metals, hydroxides from alkaline-earth metals, ammonia, organic bases and combinations thereof.

22. The device of claim 10, wherein the combustion source comprises an internal combustion engine used to power a vehicle.

23. The device of claim 22, wherein the vehicle is a bus.

24. The device of claim 22, wherein the vehicle is an automobile.

25. The device of claim 22, wherein the vehicle is a water craft or ship.

26. The device of claim 10, wherein the combustion source comprises a fixed combustion device.

27. The device of claim 26, wherein the fixed combustion device comprises a boiler, an incinerator, a power generator, a burner or a furnace.

* * * * *